United States Patent [19]
Boykin

[11] Patent Number: 5,145,740
[45] Date of Patent: Sep. 8, 1992

[54] RETRACTILE SPEARGUN LINE

[75] Inventor: Michael A. Boykin, 5039 Greenway Dr. N., Jacksonville, Fla. 32244

[73] Assignees: Michael A. Boykin; Dorothy M. Boykin, both of Jacksonville, Fla.

[21] Appl. No.: 575,290

[22] Filed: Aug. 30, 1990

[51] Int. Cl.⁵ .................................................. F41B 7/04
[52] U.S. Cl. ........................................ 428/371; 428/37; 428/222; 428/906; 124/20.3; 124/21; 124/22; 124/26; 124/27
[58] Field of Search ..................... 124/2.03, 22, 21, 26, 124/27; 428/371, 37, 222, 906

[56] References Cited

U.S. PATENT DOCUMENTS

| | | | |
|---|---|---|---|
| 305,873 | 9/1884 | Williams | 124/27 |
| 1,297,344 | 11/1918 | Glass | 124/26 |
| 1,727,812 | 9/1929 | David | 124/26 |
| 2,839,862 | 6/1958 | Hanshaw | 124/27 |
| 3,949,731 | 4/1976 | Caso | 124/27 |
| 4,318,389 | 3/1982 | Kiss, Jr. | 124/22 |

FOREIGN PATENT DOCUMENTS 888289 6/1943 France.
888236 12/1943 France.

*Primary Examiner*—George F. Lesmes
*Assistant Examiner*—Beverly A. Pawlikowski

[57] ABSTRACT

A retractile speargun line suitable for use in conjunction with a speargun comprising a line of flexible linear material having a first end adapted for connection to a speargun and a second end adapted for connection to a speargun spear by the use of a clip attached at each such end of the type used for leader lines in fishing, said flexible linear material having a springlike helical configuration.

4 Claims, 1 Drawing Sheet

RETRACTILE SPEARGUN LINE

BACKGROUND OF THE INVENTION

1. Field of the Invention

This invention is related, in general, to the field of retractile cords/lines formed from plastic materials and to the field of spearguns utilizing a line attached to the spear for recovery of same. It describes a speargun line formed from retractile materials and the method of producing same.

2. Description of Prior Art

Spearguns developed for underwater use in spearfishing have a longstanding history. Typical examples of same (and of harpoon guns, a related field) can be found in U.S. Pat. Nos. 2,301,789; 2,789,465; 2,964,031; 3,102,525; 3,139,692; 3,153,875; and 4,651,454. The applicant is aware of no prior U.S. Patents focusing specifically on the nature and type of line utilized. Instead, the examples cited focus, where they address the issue at all, on the means and manner by which a standard, nonretractile line may be coiled prior to firing and smoothly dispensed upon release of the spear. Only one patent (U.S. Pat. No. 3,102,525) prescribes a mechanical means by which the line may be recovered—a simple hand cranked reel of the type commonly used for fishing purposes. In actual practice, however, this mechanism is seldom used even when incorporated in a speargun. Thus, the most common, and generally the only, way of recovering spear, line and (hopefully) the targeted fish is for the diver to pull same, hand-over-hand, back to him/her after firing. This results in a tangle of line (generally 18 to 20 feet in length) floating by or around the diver. The line must then be laboriously recoiled/repositioned prior to reuse of the speargun. This is not only dangerous to the diver due to the risk of entanglement occasionally posed by the process, it wastes valuable minutes/air from the set amount available to the diver for his/her dive.

In the second field referenced, that of retractile cords, typical examples of the art may be seen in U.S. Pat. Nos. 2,392,842; 2,413,715; and 2,573,439. U.S. Pat. No. 2,392,842, issued to H. J. Doell in 1946, describes a method of making coiled structures from synthetic linear polymeric materials without the use of a mandrel or cylinder by twisting the filament strands of the materials utilized. U.S. Pat. No. 2,413,715, issued to A. R. Kemp, et al, in 1947 describes a means for producing a retractile electrical cord. Utilizing the teaching of this patent, such cords may be produced by twisting a rubber jacketed electrically conductive line as it is wound in the form of a helix on a mandrel, and then subjecting same to a heat treatment. Similarly, U.S. Pat. No. 2,573,439, describes a retractile cord composed of numerous insulated conductors wound around a central strand of thermo plastic material. The basic method for producing such cords as described in this patent utilizes, once again, the steps of winding the component strands tightly on a mandrel and subjecting same to heat to set the materials, particularly the central strand of thermoplastic material, in their helical configuration. However, none of the methods, materials, or retractile lines described above, or anything similar thereto, have hitherto been utilized for the convenience and assistance of divers.

SUMMARY OF OBJECTS OF THE INVENTION

The primary object of this invention is to produce a retractile line of a type suitable for use in conjunction with a speargun to replace the speargun lines now in common use. A further object of this invention is to produce a retractile speargun line that is simple and inexpensive to manufacture, and overcomes the difficulties experienced by divers in utilizing nonretractile lines, as described above. These goals are accomplished by the simple method, as described herein, of taking a suitable length of heavy gauge fishing line ((0.080), wrapping same on a mandrel in helical fashion, subjecting same to heat for a length of time sufficient to "set" the line in its helical configuration, and attaching clipping means to each end thereof. The speargun line produced, as described in more detail below, may be simply and easily attached and utilized in conjunction with all spearguns currently in common use, and completely obviates and avoids the difficulties described above.

DETAILED DESCRIPTION

Figure 1:
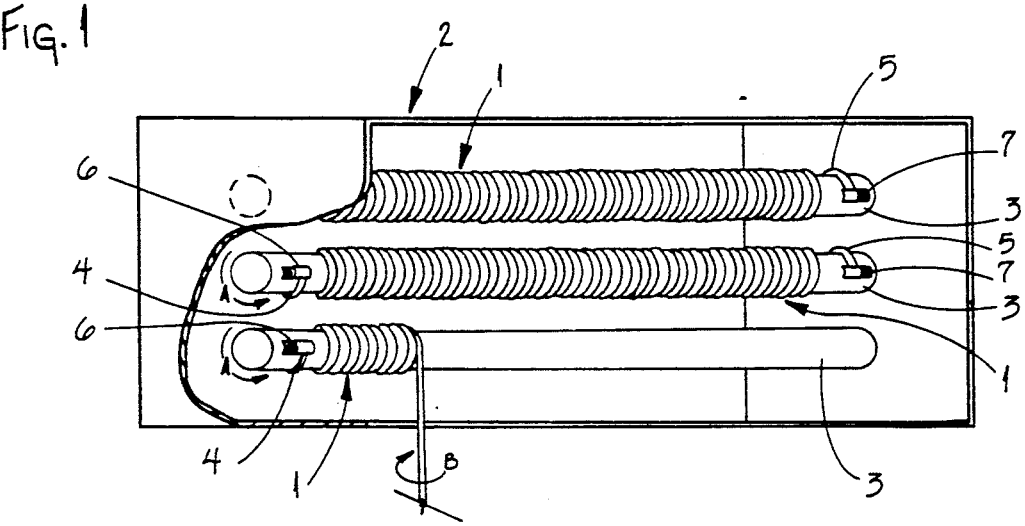
FIG. 1 provides a perspective view of an oven in which the helically wound speargun line is subjected to heat treatment. A portion of the wall of the oven proximate the viewer has been removed for illustrative purposes to allow the nature of the mandrels shown therein and the connection of lines to same to be more clearly seen.

FIG. 1 illustrates an oven 2 in which three speargun lines 1 helically wound on mandrels 3 are being subjected to heat to "set" the lines in their helical configuration. The upper two speargun lines 1 are secured at their first ends 4 and their second ends 5 to the mandrels 3 by means, respectively, of first clamps 6 and second clamps 7. Each speargun line 1 may be precut prior to heat treatment to a desirable length (eighteen feet (18') being an optimum), or may be cut to desirable length after heat treatment, but prior to the fitting of clips to its first end 4 and its second end 5.

The line utilized may be wound by any of numerous methods well known in the art. In the example illustrated in FIG. 1, helical coils are formed by securing one end of the line shown, denoted in this example as the first end 4 to the mandrel 3 by means of a first clamp 6 and rotating the mandrel 3 in a direction indicated by arrows A by a source of power (not shown). As the line is laid upon the mandrel 3 it may be twisted as shown by the arrow B in FIG. 1, so that the torsional strains produce a back-set between adjacent turns of the helix forcing its coil into an even tighter configuration. In the alternative, it may be suitably formed without such twisting to produce a back-set. Indeed, the simplicity of the method claimed herein allows the formation of speargun lines in accordance with the teaching of this invention by hand winding of the subject line. Thus, by way of example, it is quite possible to form a speargun line in accordance with this invention by hand coiling a suitable length of line on any cylindrical object capable of withstanding extreme heat without melting or deformation, securing the line to the cylindrical object, and subjecting line and cylinder to heat sufficient to set the line in its coiled/helical configuration.

Without seeking to limit the possible variations within the ambit of this invention, applicant would note that the following specific criteria may advantageously be used in forming a speargun line in accordance with the teachings disclosed herein: (a) it has been found that common, heavy gauge plastic fishing line (0.080) of the type used for game fish in deep sea fishing has suitable characteristics both in terms of strength and in terms of its ability to be set in a helical configuration for use in forming speargun line; (b) that a length of 18 feet of said line tightly wound with adjacent coils in proximate contract on a mandrel or cylinder with diameter of ⅝ inches will produce a coil of suitable dimension after it has been "set" in this configuration by heat treatment; and (c) that an oven temperature of 400 degrees Fahrenheit maintained for approximately five (5) minutes followed by cooling at room temperature will "set" said line permanently in its coiled configuration.

Figure 2:
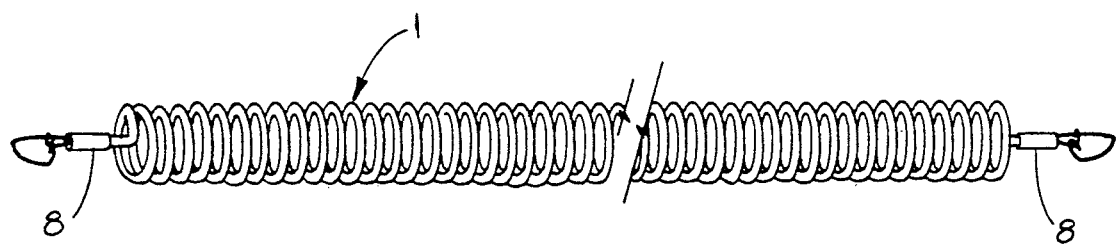
FIG. 2 illustrates the speargun line after it has been "set" in its helical configuration with clipping means attached at either end thereof.
Figure 3:
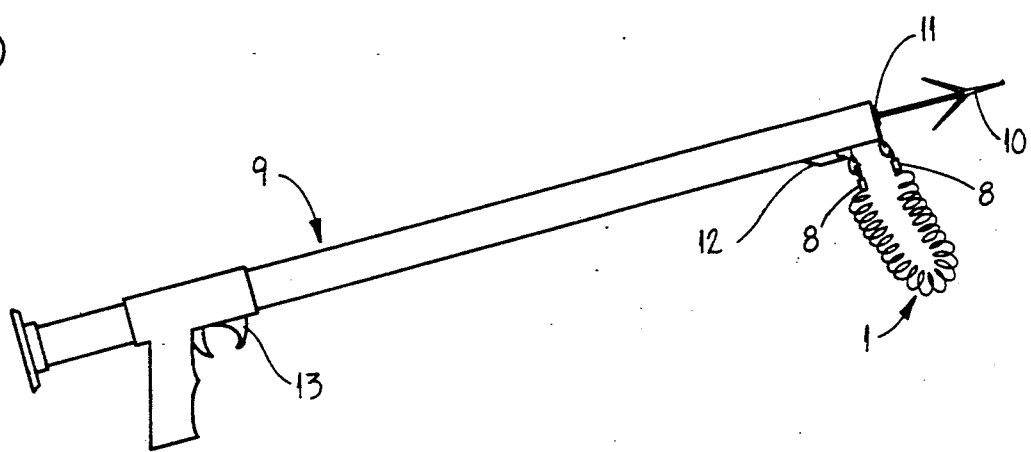
FIG. 3 illustrates the manner in which the speargun line taught herein is attached to a commonly used type of speargun (which is shown for illustrative purposes only).

As illustrated in FIG. 2, the speargun line 1 produced may then be advantageously fitted with clipping means 8 at either end allowing it to be easily connected/disconnected from speargun and spear. A common clip of the type normally used for leader lines in fishing and well known in the art for this purpose, is highly suitable for this use and is illustrated as the clipping means 8 at either end of the speargun line 1 illustrated in FIG. 2. FIG. 3 illustrates, in general fashion, the typical manner in which a speargun line produced in accordance with this invention would be attached and used with a common type of speargun 9. The typical speargun 9 utilizes a spear 10 with a sliding ring 11 to which the speargun line 1 (or any speargun line) would be attached. An ordinary speargun line (not shown) would be coiled between the front extension 12 and the rear extension 13 of the speargun 9. The rear extension 13 pivots forward or is otherwise moved to a position where it does not hinder the uncoiling/extension of said ordinary speargun line (not shown) when the spear 10 is fired. However, when retrieving the spear 10 the ordinary line (as previously discussed with regard to the background of this invention) must be laboriously recovered, generally becomes tangled around the diver, and must invariably be recoiled between the front extension 12 and the rear extension 13 prior to reuse.

The speargun line 1 produced in accordance with this invention completely avoids the aforesaid problems. The process and method discussed above produces a compact coil approximately two (2) feet long in its unextended state. When attached to the sliding ring 11 of the spear 10 and the front extension 12 of the speargun 9 prior to firing, as illustrated in FIG. 2, it is folded in half, forming an even more compact attachment to the speargun 9. Due to its small compact size, it does not interfere with the diver or the use of the speargun 9 prior to firing. The bias created in the speargun line for the coiled configuration shown, while sufficient to enable the speargun line 1 to recover its coiled configuration after the tension holding it in an extended state is released, is not so strong as to impede the free movement of the spear 10 upon firing. Finally, after firing, the speargun line 1 does not need to be laboriously recovered and recoiled. The diver is free to simply swim to the vicinity of the spear 10 with the speargun 9 in hand. The speargun line 1 produced in accordance with this invention will automatically resume its compact configuration. Thus, the spear 10 can then be reinserted into the speargun 9 for refiring without any special preparation or attention to the speargun line 1.

As outlined above, the speargun line 1 produced in accordance with this invention avoids initial coiling or recoiling prior to firing, obviates the need to recover the line prior to or as part of the recoiling process, and completely avoids the danger of entanglement inherent in the use of liens currently produced for this purpose. It accomplishes its goals in a simple and direct manner, is inexpensive to manufacture, and easy to use. The embodiments described are, however illustrative in nature, the invention being limited only by the claims set forth below.

I claim:
1. A retractile speargun line comprising:
   a line of flexible linear material having a first end adapted for connection to a speargun and a second end adapted for connection to a speargun spear by having attached at each such end a clip of the type used for leader lines in fishing, said length of flexible linear material being formed in such a manner as to be biased to assume a compact, springlike helical configuration when its first end and its second end are not subjected to forces tending to distance them from each other, but not being biased toward its compact, springlike helical configuration to such an extent as to substantially impede the movement of a spear to which it may be attached upon firing from a speargun to which it also may be attached.

2. The Retractile Speargun Line, as set forth in claim 1, wherein the length of the flexible linear material is approximately 18 feet.

3. The Retractile Speargun Line, as set forth in claim 1, wherein the line is formed from a flexible thermoplastic material.

4. The Retractile Speargun Line, as set forth in claim 1, wherein the diameter of the coils in the line, when it has assumed its compact, springlike configuration, is approximately ⅝ inch.

* * * * *